United States Patent [19]

Littley et al.

[11] 4,226,151
[45] Oct. 7, 1980

[54] SLITTER HAVING ARBOR PAIRS MOUNTED ON A CASTER SUPPORTED BASE SHIFTABLE AND ORIENTABLE ALONG THE SLITTER FRAME

[75] Inventors: John J. Littley, Hamilton; Carl W. Koors, Harrison, both of Ohio; Richard F. Fussner, Brookville, Ind.; Frank Lengel, Cincinnati, Ohio

[73] Assignee: Cincinnati Incorporated, Cincinnati, Ohio

[21] Appl. No.: 24,970

[22] Filed: Mar. 29, 1979

[51] Int. Cl.$^3$ ............................................. B23D 19/06
[52] U.S. Cl. ..................................... 83/479; 83/425.4; 83/481; 83/492; 83/699; 83/433
[58] Field of Search ..................... 83/479, 407, 425.4, 83/481, 492, 498, 699, 926 G, 433, 701; 242/56 A, 56.2, 56.7; 93/58 R, 58.2 R, 58.4

[56] References Cited

U.S. PATENT DOCUMENTS

| Re. 27,918 | 2/1974 | Montguire | 83/479 X |
| 3,408,886 | 11/1968 | David | 83/479 X |
| 3,727,503 | 4/1973 | Braner et al. | 83/479 |
| 3,800,648 | 4/1974 | Nishiyori et al. | 83/479 |
| 4,142,455 | 3/1979 | Coburn | 83/479 X |

FOREIGN PATENT DOCUMENTS

2229452 12/1972 Fed. Rep. of Germany ............. 83/479

*Primary Examiner*—Donald R. Schran
*Attorney, Agent, or Firm*—Frost & Jacobs

[57] ABSTRACT

An arbor slitter for use in a slitting line, the arbor slitter having at least two pairs of cooperating, blade-carrying arbors. The inboard ends of the arbors of each arbor pair are supported by an inboard bearing housing. The inboard bearing housings of the arbor pairs are mounted on a common base having caster means resting upon a smooth upper surface of a portion of the slitter frame. The base by virtue of its caster means is both shiftable and positionable along this upper surface of the slitter frame so that each arbor pair can be shifted between a working position and a set-up position. The slitter frame has an outboard bearing housing movable thereon into and out of engagement with the outboard ends of the arbors of each arbor pair when in the working position.

13 Claims, 12 Drawing Figures

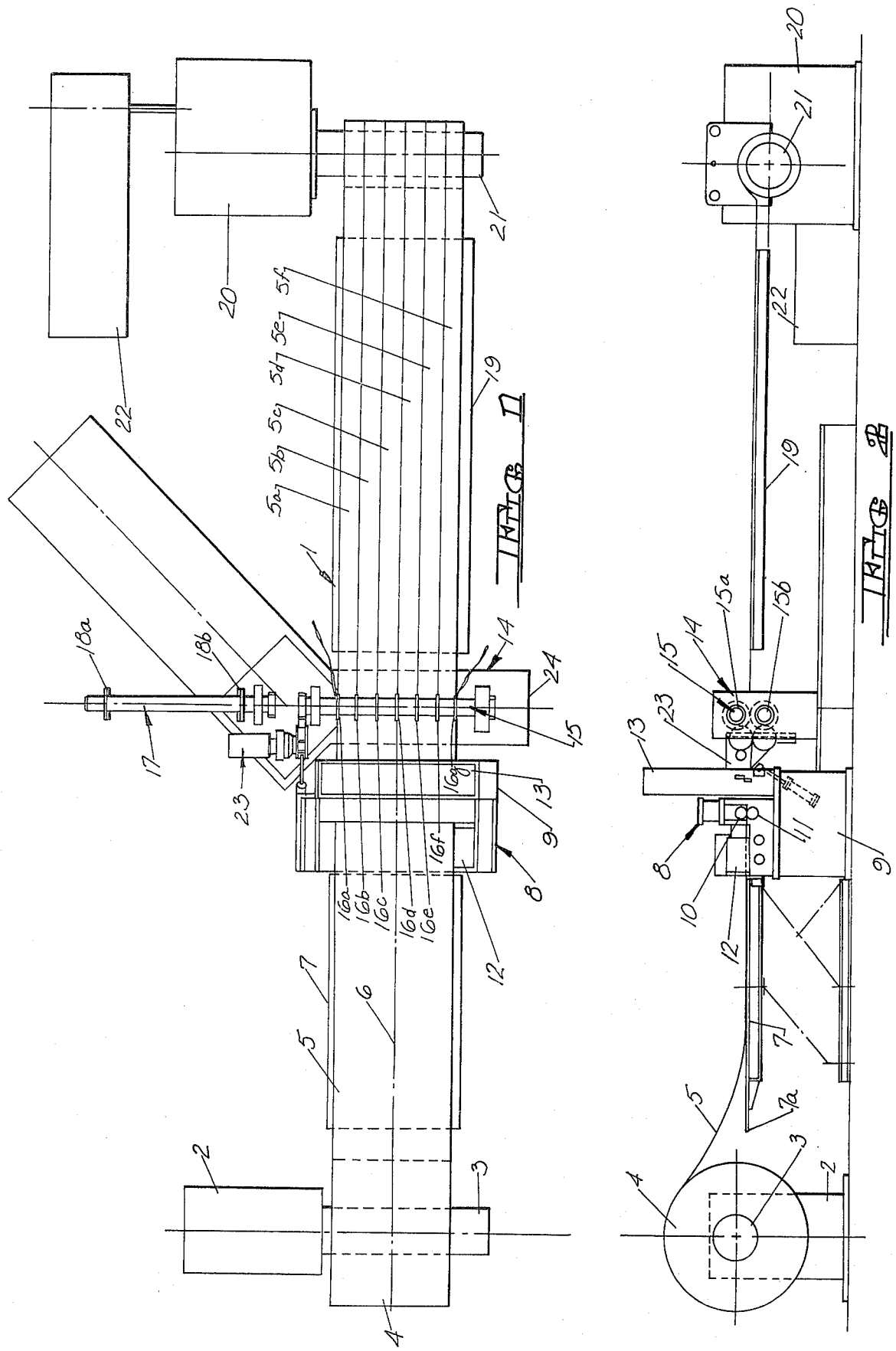

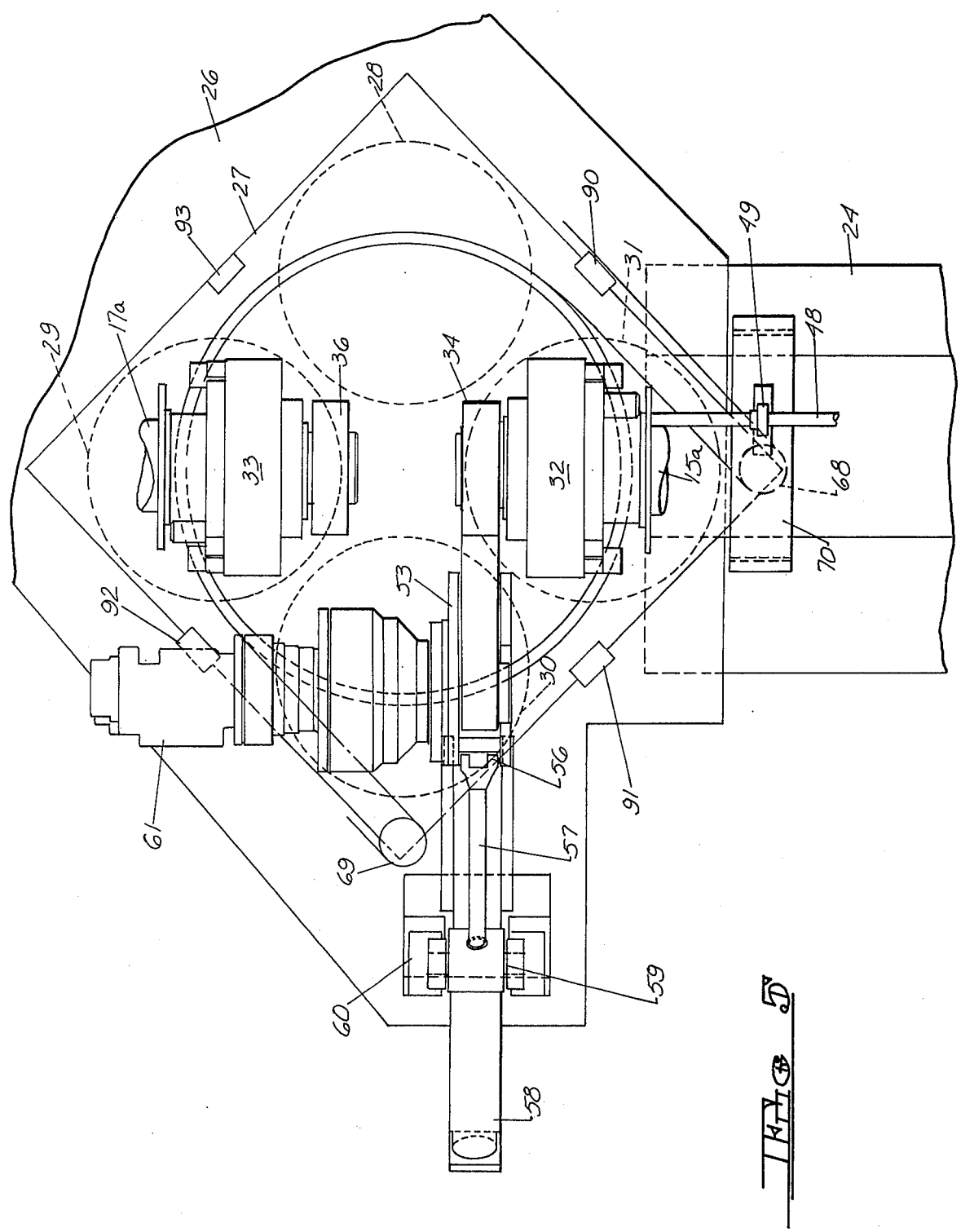

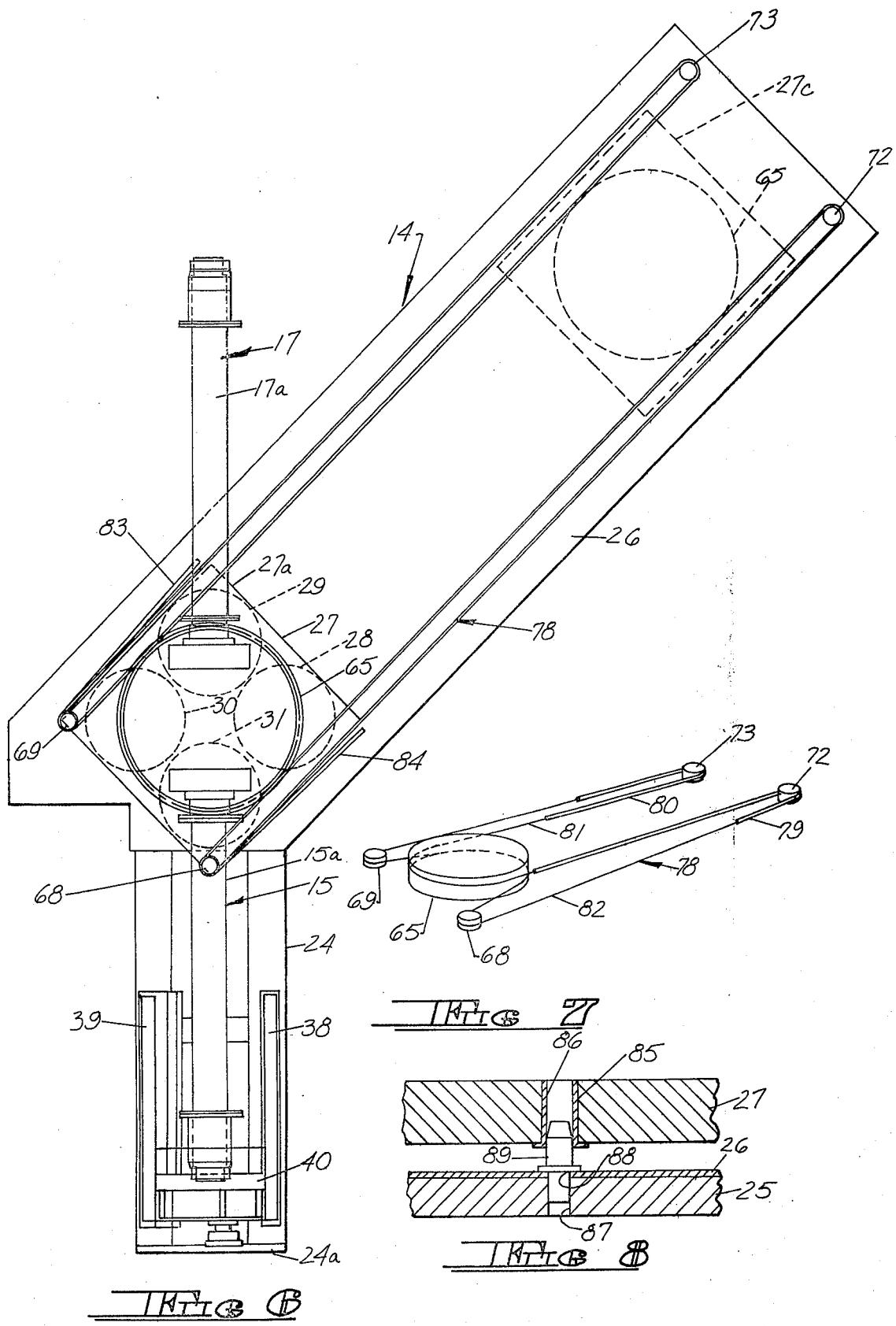

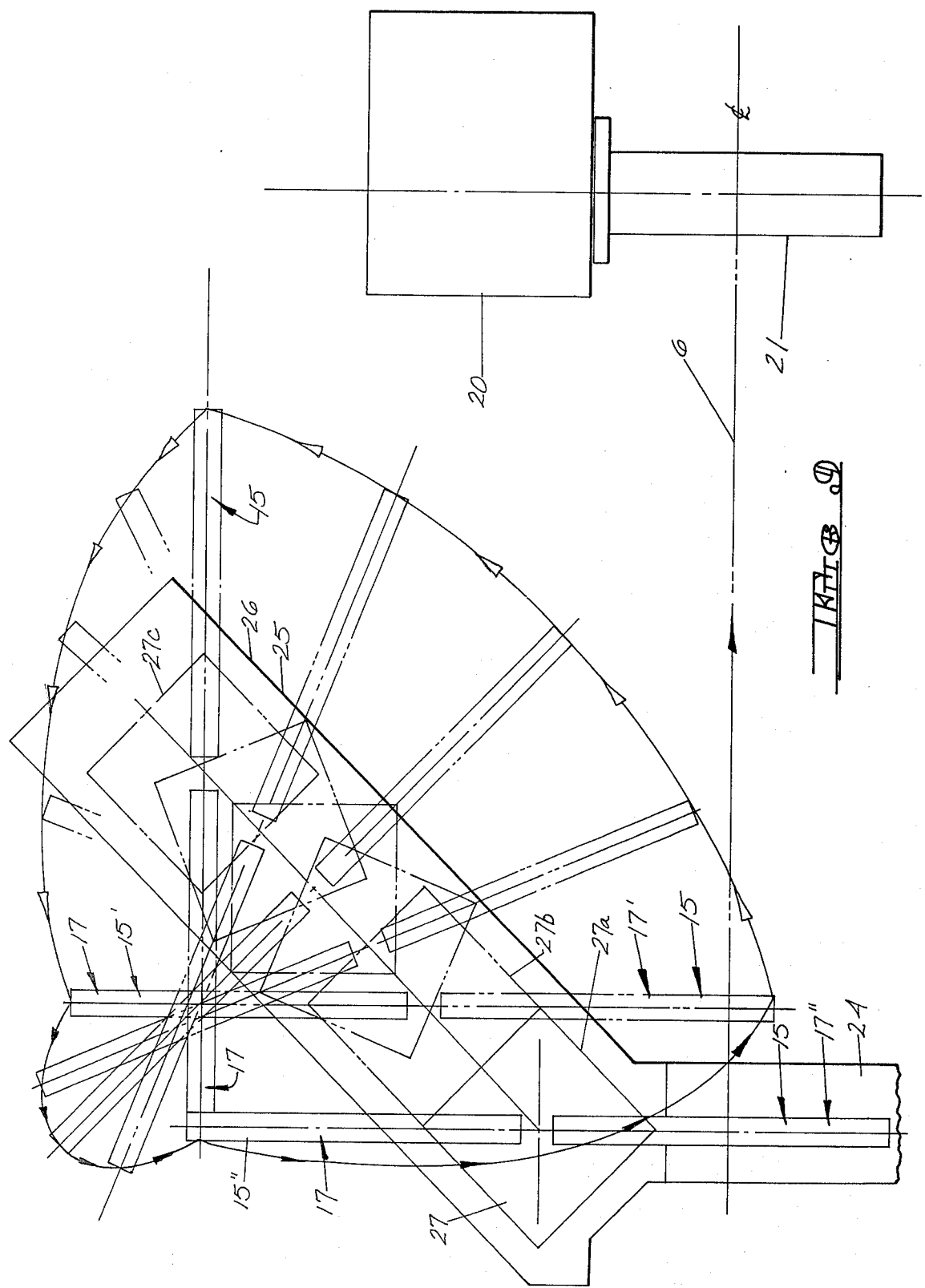

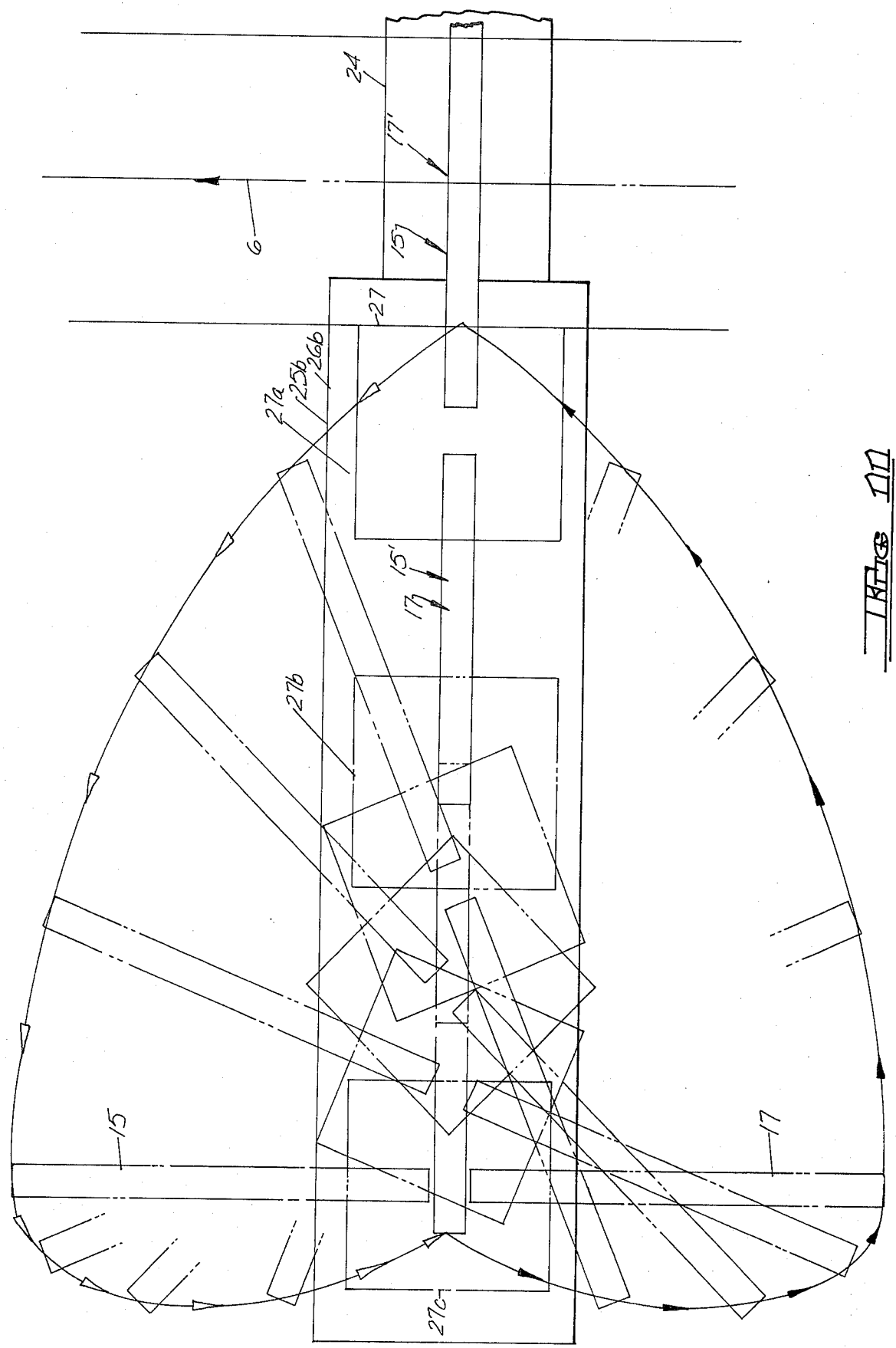

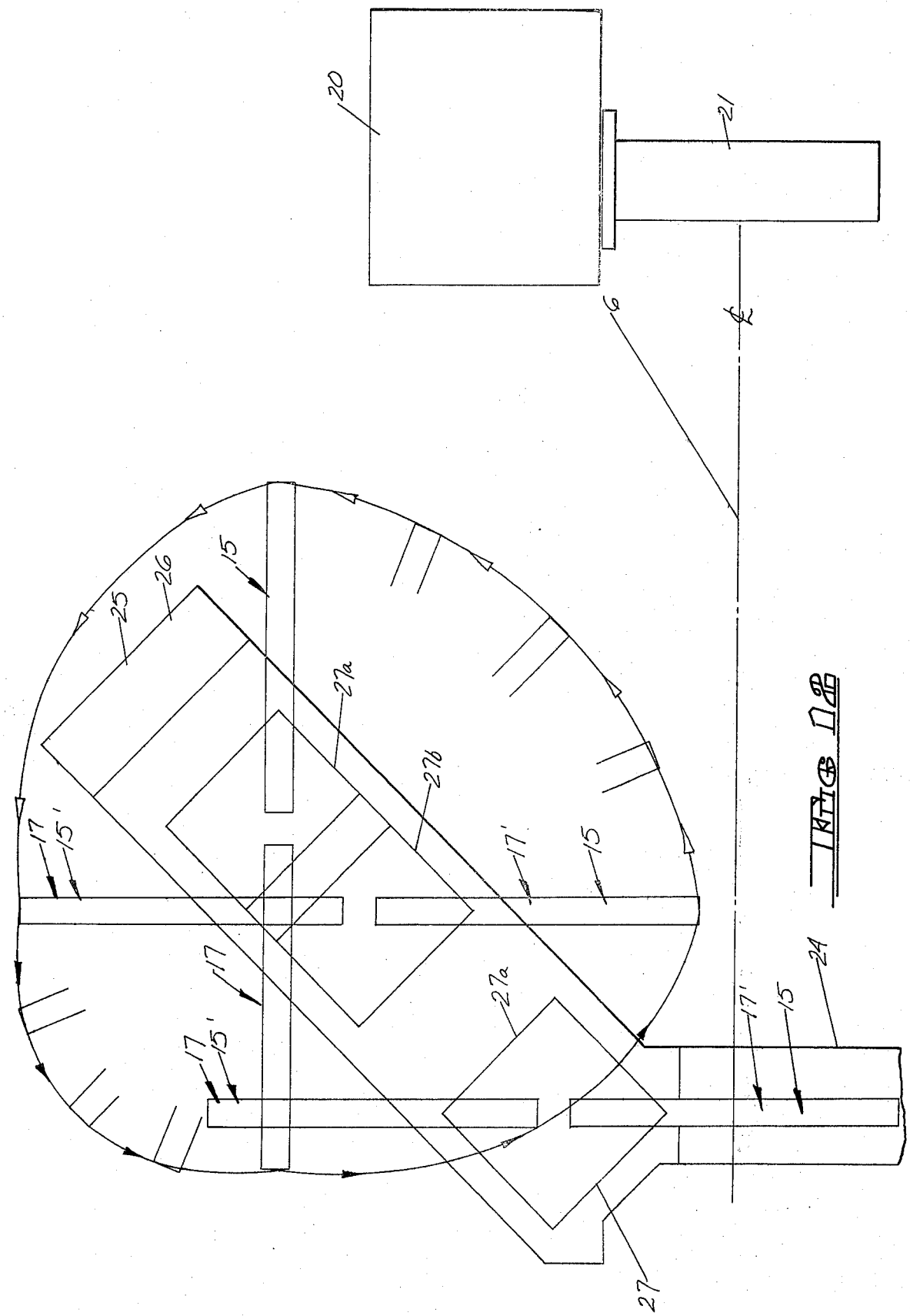

SLITTER HAVING ARBOR PAIRS MOUNTED ON A CASTER SUPPORTED BASE SHIFTABLE AND ORIENTABLE ALONG THE SLITTER FRAME

TECHNICAL FIELD

The invention relates to an arbor slitter and more particularly to a slitter having arbor pairs mounted on a common base, the common base being caster supported and both shiftable and rotatable along a portion of the slitter frame so that each arbor pair can be moved between a working position and a set-up position.

BACKGROUND ART

The present invention is directed to arbor slitters for slitting coils of metallic or nonmetallic materials into strips of narrower width. While not intended to be so limited, the slitter of the present invention will be described in its application to a precision slitting line for coils of metallic material.

In the operation of a typical precision slitting line, a metallic coil to be slit is mounted on an appropriate payoff reel. A peeler lifts the leading end of the coiled strip from the coil and directs the strip to power feed and strip alignment means. From this last mentioned means, the strip passes through an arbor slitter and ultimately to a recoiler where the individual narrower strips formed by the slitter are recoiled. The slitter, itself, comprises a pair of parallel cooperating arbors, the ends of which are mounted in suitable bearing housings. The cooperating pair of arbors carry coacting rotary slitting knives appropriately spaced along the arbors by distances corresponding to the widths into which the strip is to be slit.

Set-up or arrangement of the slitting knives on the arbor, which normally must be very precise, is a time consuming operation. During set-up, the slitting line must be shut down. Down time for the slitting line represents a loss of valuable production time. It is not uncommon that when a number of relatively small orders are to be processed, more time is consumed in set-up than in production.

Prior art workers have taken several approaches toward the reduction of set-up time. A common approach is simply to provide two arbor slitters for the slitting line. While one arbor slitter is in the line in production, the other arbor slitter can be located in a service area where it can be appropriately set-up for the next production run. While this procedure significantly reduces down time, it requires a duplication of equipment together with additional equipment to shift the arbor slitters between the line and the service area. The substitution of one arbor slitter for another requires down time for the line even though it be less than that required if only a single arbor slitter is used.

U.S. Pat. No. 2,291,789 is representative of another prior art approach wherein pairs of cooperating arbors are mounted on a framework. The framework is rotatable about a shaft extending transversely of the slitting line. In such an arrangement, however, when one cooperating pair of arbors is in a working position, the remaining pairs of arbors are located beneath the slitting line and are not conveniently positioned for set-up.

U.S. Pat. No. 3,503,293 is exemplary of prior art attempts to provide auxiliary equipment to speed up set-up time. This reference teaches a transfer device having elements which can be brought into alignment with the working arbors to receive the old arrangement of blades to be removed from the arbors and to shift to the arbors a new arrangement of blades for the next slitting operation. Such a system still requires considerable down time for the line.

Yet another approach is illustrated in U.S. Pat. Nos. 3,727,503 and Re. 27,918 together with Italian Pat. No. 932,425. U.S. Pat. No. 3,727,503 and Italian Pat. No. 932,425 teach the provision of a plurality of cooperating pairs of arbors radially mounted on a turntable. As a result, each cooperating pair of arbors can be rotated between a working position wherein they extend transversely of the slitting line and a set-up position extending away from the slitting line. U.S. Pat. No. Re. 27,918 teaches the provision of a plurality of slitters, radially arranged and mounted on a turntable, each slitter being shiftable between a working position and a set-up position.

While these arrangements represent an advance in the art, they do have certain drawbacks. First of all, rotation of the arbor pairs (or a plurality of slitters as in U.S. Pat. No. Re. 27,918) describes a large circular envelope requiring considerable room. This envelope also overlies the feed and strip alignment mechanism ahead of the slitter in the slitting line and therefore this equipment must also be shiftable, collapsible or otherwise movable out of the envelope during change over from one arbor pair to another. Such movement of the feed and alignment mechanism is in itself time consuming and difficult in that the positioning of the feed and alignment mechanism is critical in the slitting line.

The present invention is directed to a slitter having a supporting framework comprising a first portion extending transversely of the slitting line and a second extended portion located at the inboard end of the first portion. Two or more pairs of cooperating arbors are supported at their inboard ends by inboard bearing housings, all of which are mounted on a common base. The base is provided with caster means and is free to both shift along and reorient on the upper surface of the second extended portion of the slitter frame. The outboard end of the first portion of the slitter frame carries an outboard bearing housing which is engageable with any one of the arbors pairs when that arbor pair is in its working position. By this arrangement, the arbor pairs can be shifted and reoriented between working and set-up positions and this shifting and orienting defines an envelope which does not interfere with the feed and strip alignment mechanism of the slitting line. As will be described hereinafter, the envelope can be modified so as to avoid other obstacles or mechanisms near the slitting line, giving greater freedom of location for the slitting line. Change-over from one pair of arbors to another can be accomplished by manually operated controls or in a fully automated manner, as will be described.

DISCLOSURE OF THE INVENTION

The slitter of the present invention is provided with at least two pairs of cooperating, blade-carrying arbors. The inboard ends of the arbor pairs are mounted in inboard bearing housings. These housings, in turn, are located on a common base.

The slitter has a supporting frame, a first portion of which is located transversely of the slitting line. A second portion of the slitter frame constitutes a frame extension at the inboard end of the first portion. The angular relationship between the first and second frame portions can vary from the second frame portion being coextensive with the first frame portion to the second frame portion being oriented at 90° to the first frame portion.

The inboard end of the first frame portion and the entire second frame portion are provided with a smooth, flat, continuous upper surface. The arbor pair supporting base is mounted on this flat surface and is provided with caster means so that it can be shifted along and oriented on this surface. As a result of the shifting and orienting of the base member on this frame surface, any one of the cooperating arbor pairs can be moved between a working position extending transversely of the slitting line and a set-up position extending away from the slitting line. This shifting of the arbors pairs can be performed without interference with the strip feed and alignment mechanism of the slitting line. The outboard end of the first frame portion supports an outboard bearing housing which can be moved into and out of engagement with any of the arbor pairs which are located in the working position.

A cable and chain assembly is provided to cause the appropriate shifting and orientation of the arbor carrying base along the smooth upper surface of the frame. The chain and cable assembly is powered by driven sprocket means. The operation of the chain and cable assembly can be either manually or computer controlled.

Finally, the upper smooth surface of the slitter frame is provided at the inboard end of the first frame portion with guide means to assure proper alignment of the desired one of the cooperating arbor pairs when in its working position. Disengageable locking means maintain the base and the desired one of the arbor pairs in their proper working positions.

BRIEF DESCRIPTION OF THE DRAWINGS

FIG. 1 is a semi-diagrammatic plan view of an exemplary slitting line provided with the slitter of the present invention.

FIG. 2 is a semi-diagrammatic side elevational view of the slitting line of FIG. 1.

FIG. 3 is an end elevational view of the slitter of the present invention, as seen from the left in FIGS. 1 and 2.

FIG. 4 is a fragmentary cross sectional view taken along section line 4—4 of FIG. 3.

FIG. 5 is an enlarged, fragmentary, plan view illustrating the arbor supporting base in its working position.

FIG. 6 is a plan view of the slitter of the present invention.

FIG. 7 is a semi-diagrammatic, perspective view of the cable and chain assembly of the present invention.

FIG. 8 is a fragmentary cross sectional view illustrating one of the locating means for the base when in its working position.

FIGS. 9 through 12 are semi-diagrammatic plan views of the slitter of the present invention, illustrating various orientations of the slitter frame second portion with respect to the slitter frame first portion and the envelopes described by the arbors during change over thereof.

DETAILED DESCRIPTION OF THE INVENTION

Figure 10:
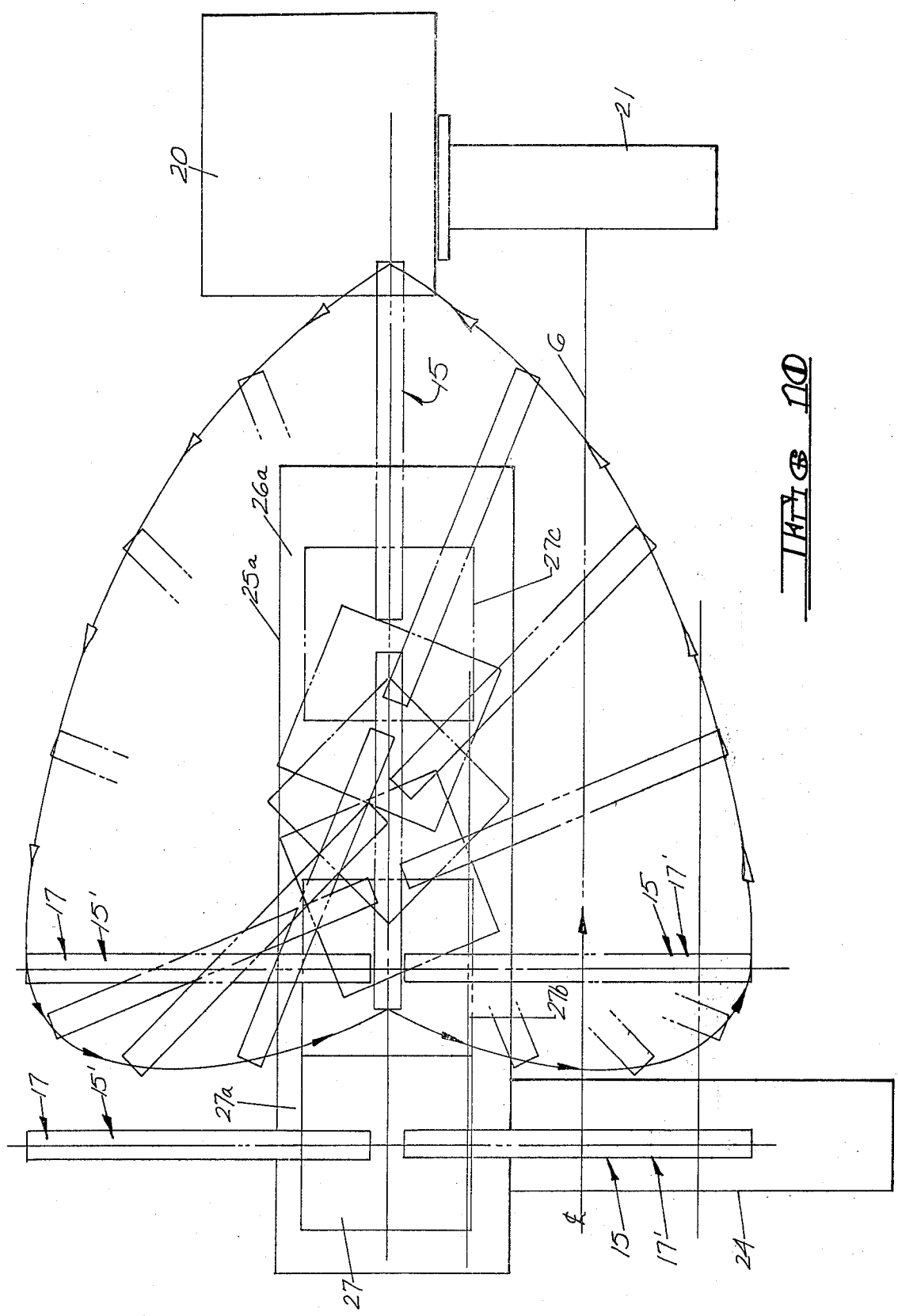

Reference is first made to FIGS. 1 and 2 which semi-diagrammatically illustrate a slitting line provided with the slitter of the present invention. The slitting line, generally indicated at 1, comprises a payoff reel 2 having an expandable mandrel 3 upon which a coil 4 of continuous strip metallic material 5 may be located. The payoff reel 2 and its mandrel 3 may be shiftable along a path transverse the center line 6 of the slitting line so that coils thereon may be properly aligned and so that coils of different widths may be accommodated. The slitting line may include a self-contained coil car (not shown) by which a coil is brought from a coil storage area or multiple arm coil carrier (not shown) to the mandrel 3 of payoff reel 2. The slitting line may next be provided with a coil peeler table 7 used in the initial threading procedure of the strip 5 through the slitting line 1. The coil peeler table is shiftable (hydraulically or otherwise) so that its rearward end 7a can move rearwardly and upwardly to "peel" the leading edge of the strip 5 from coil 4. The peeler table 7 thereafter guides the forward edge of the strip 5 to the next element in the slitter line. This next element comprises a power feed and strip alignment means and is generally indicated at 8. The element 8 comprises a stand 9 which supports a pair of pinch rolls 10 and 11 used to shift the strip 5 into the slitter. The stand 9 also supports automatic edge-control means 12, known in the art, and adapted to compensate for coil distortion and to automatically shift the payoff reel 2 to assure constant trim. The stand 9 may also carry a crop shear 13 which squares the leading end of the strip 5 to assure accurate alignment. From the multi-purpose element 8, the strip passes through the slitter of the present invention, which is generally designated at 14. The slitter 14 is shown having a first pair of cooperating, blade-carrying arbors in the working position. This first pair of cooperating arbors is generally indicated at 15 and is made up of an upper arbor 15a and a lower arbor 15b. In FIG. 1, the upper arbor 15a is shown carrying seven blades 16a through 16g. It will be understood that lower arbor 15b will have a cooperating set of blades. The outermost blades trim the edges of strip 5. In FIG. 1 the slitter is illustrated as having a second pair of arbors, generally indicated at 17 and located in a set-up position. In this position an arrangement of blades (some of which are shown at 18a and 18b) can be mounted on the arbor pair 17 for the next slitting run.

The arbor pair 15 slits the strip 5 into individual strips 5a through 5f. After passage through slitter 14, the strips 5a through 5f pass over threading table 19 to a recoiler 20 having an expandable mandrel 21 upon which the individual strips 5a through 5f are coiled. The threading table 19 is used only during thread-up of the slitting line and is retracted to an out of the way position during running of the slitting line.

The recoiler 20 and its expanding mandrel 21 are powered by an appropriate prime mover 22.

The arbors 15a and 15b of arbor pair 15, which are shown in their working position, may be driven by an arbor drive 23 which is shiftable into and out of engagement with arbors 15a and 15b. In the most usual practice, arbor drive 23 is used only during the thread-up procedure. During operation of the slitting line, the strip 5 is pulled through the line by recoiler 20 and its mandrel 21.

Figures 3, 4:
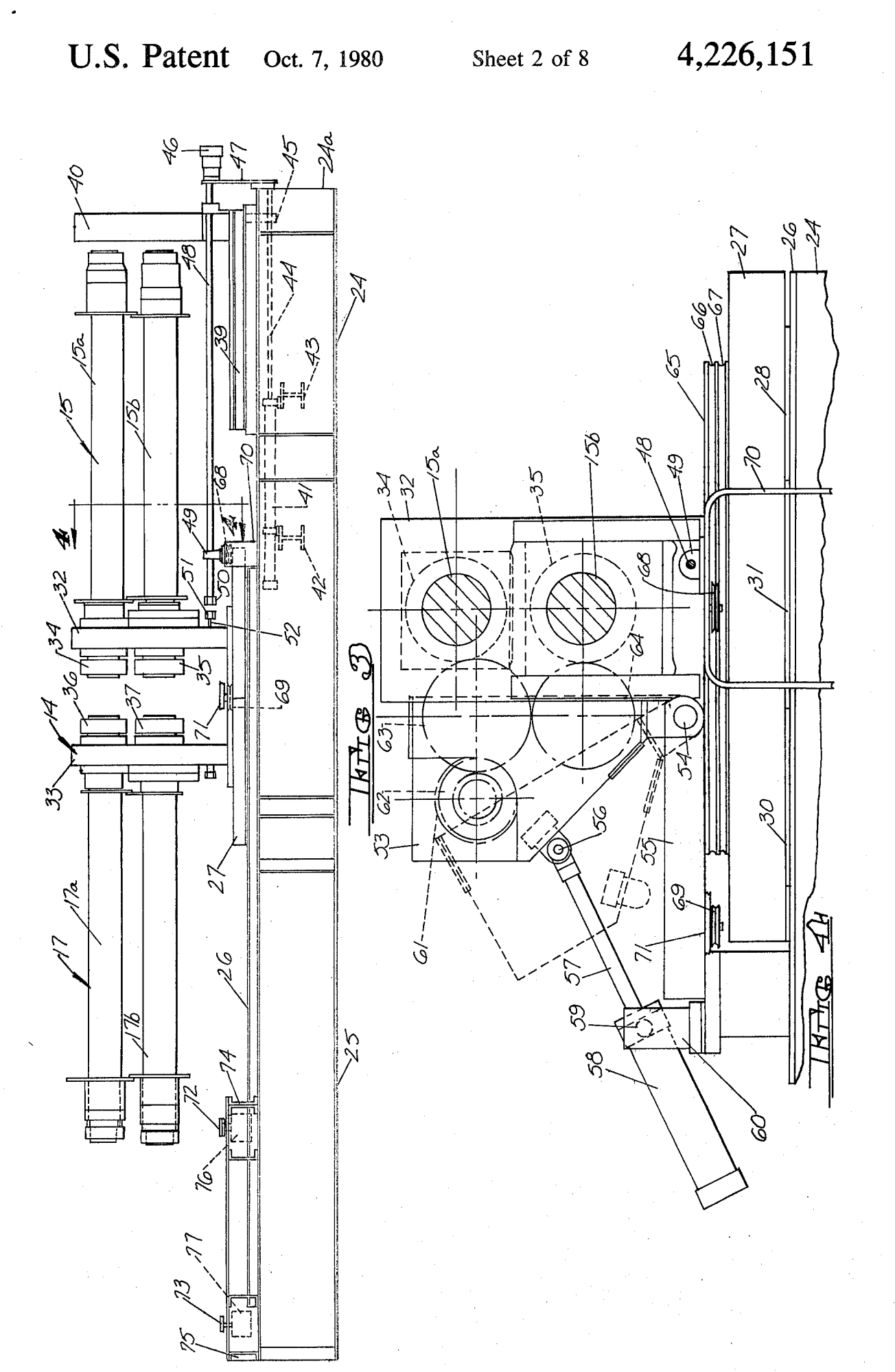

Reference is now made to FIGS. 3 and 6 wherein the slitter 14 of the present invention is shown and wherein like parts have been given like index numerals. The slitter 14 comprises a first frame portion 24 which, as can be seen most clearly in FIG. 1, extends transversely of the center line 6 of the slitting line 1. The frame portion 24 has an outboard end 24a and an inboard end 24b. The slitter has a second frame portion or extension 25 which is located at the in-board end 24b of the first frame portion 24 at an angle of about 45° thereto in the embodiment of FIGS. 3 and 6. The frame portions 24 and 25 are adapted to rest upon the floor or other appropriate surface on which the slitter is mounted. The individual structural members making up frame portions 24 and 25 are conventional and do not constitute a limitation of the present invention. The upper surface of the second frame portion or extension 25 and the upper surface of the first frame portion 24 at its inboard end are covered with an appropriately supported continuous sheet metal member 26 which provides a smooth and uninterrupted surface.

A base 27 of square configuration is shown in FIGS. 3 and 6 in its working position on the smooth surface 26 over the inboard end 24b of frame portion 24. The base 27 is provided with caster means so that it is free to both shift and rotate along the surface 26, as will be described hereinafter. The caster means for the base 27 may be of any well known type including mechanical casters, water casters or air casters. Excellent results have been achieved through the use of air casters manufactured by Aero-Go, Inc., of Seattle, Wash., under the mark AERO-CASTER, Model #K21N. In FIG. 6, the base 27 is shown provided with four such air casters, illustrated in broken lines at 28 through 31.

Mounted on base 27 there is an inboard bearing housing 32 in which the inboard ends of arbors 15a and 15b of arbor pair 15 are mounted. A second similar inboard bearing housing 33 is mounted on base 27 and supports the inboard ends of arbors 17a and 17b of arbor pair 17. The bearing means within housings 32 and 33 are conventional and do not constitute a limitation of the present invention. The arbors 15a and 15b of arbor pair 15 may be provided with drive gears 34 and 35, the purpose of which will be described hereinafter. Similarly, arbors 17a and 17b of arbor pair 17 may have drive gears 36 and 37 similar to the drive gears 34 and 35.

It will be evident from FIGS. 3 and 6 that arbor pairs 15 and 17 extend radially from base 27 and are diametrically opposed. The axes of arbors 15a, 15b, 17a and 17b all lie in the same vertical plane. In FIGS. 3 and 6 the arbor pair 15 is shown in its working position extending transversely of the center line 6 of the slitting line. Arbor pair 17 is shown in its set-up position extending away from the slitting line and readily accessible for mounting a desired slitting blade arrangement thereon.

The outboard end 24a of slitter frame 24 has a pair of ways 38 and 39 fixed thereon. The ways 38 and 39 support an outboard bearing housing 40. As is true of inboard bearing housing 32 and 33, the bearing mechanism within outboard bearing housing 40 is conventional and does not constitute a part of the present invention. The outboard bearing housing 40 is shiftable along ways 38 and 39 between a position wherein it supports the outboard ends of arbors 15a and 15b (see FIG. 6) and a retracted position wherein the outboard ends of arbors 15a and 15b are free (see FIG. 3). It will be understood that when arbors 17a and 17b of arbor pair 17 are in the working position, the outboard bearing housing 40 can be shifted to engage and support the outboard ends of these arbors.

Any appropriate means can be used to shift the outboard bearing housing 40 along ways 38 and 39 between its retracted position and its arbor engaging position. For purposes of an exemplary showing a hydraulic cylinder 41 is shown mounted within the slitter frame 24 by appropriate supports 42 and 43. The hydraulic cylinder 41 has a piston rod 44 connected to a downwardly depending portion 45 of bearing housing 40. Appropriate actuation of hydraulic cylinder 41 will result in appropriate shifting of outboard bearing housing 40.

As is usual in slitter construction, one of the arbors of a pair is shiftable toward and away from the other arbor of the pair to assure proper alignment of the blade arrangements on the cooperating pair of arbors. This normally is accomplished by making the bearings in the inboard and outboard bearing housings for one of the arbors shiftable by jack means located within the bearing housings. In the exemplary embodiment shown in FIG. 3, it is to be assumed that the bearings (not shown) in the inboard bearing housing 32 and outboard bearing housing 40 for arbor 15b are shiftable by jack means (not shown) within those housings. To actuate the jack within outboard bearing housing 40 a hydraulic motor 46 is shown supported by a bracket 47. The bracket 47 is affixed to the outboard end 24a of frame portion 24. The hydraulic motor 46 has a shaft 48 which passes through bearing housing 40 and actuates the jack (not shown) therein. The inboard end of shaft 48 passes through an appropriate support and bearing 49 and terminates in a releaseable coupling 50. A mating coupling 51 is carried by a shaft 52 connected to the jack (not shown) in inboard bearing housing 32. As a result of this arrangement, it will be understood that the shaft 48 will shift with the outboard bearing housing 40 so that the coupling 50 will be engaged with coupling 51 when the outboard bearing housing 40 engages the ends of arbors 15a and 15b and will be disengaged from coupling 51 when the outboard bearing housing 40 is in its retracted position. It will further be understood by one skilled in the art that the hydraulic jack motor 46 could be any sort of prime mover such as an electric motor or the like, or could simply be a hand crank.

As indicated above, during the thread-up procedure it is desirable to power those arbors of that arbor pair in the working position. Reference is made to FIGS. 4 and 5 wherein like parts have again been given like index numerals. A drive housing 53 is pivotally mounted as at 54 to an appropriate bracket 55. The drive housing is pivotally connected as at 56 to the piston rod 57 of a hydraulic cylinder 58. The hydraulic cylinder 58, in turn, is pivotally mounted as at 59 to a bracket 60. The bracket 60 is mounted on the inboard end 24b of slitter frame 24. By means of hydraulic cylinder 58 and its pivotal mounting, the drive housing 53 is shiftable between a working position (shown in FIG. 5 and in hard lines in FIG. 4) and a retracted, non-working position (shown in broken lines in FIG. 4). The drive housing 53 supports a hydraulic motor 61 or other appropriate prime mover. The hydraulic motor 61 is connected directly to a drive gear 62.

The drive gear 62 is meshed with an intermediate gear 63. Intermediate gear 63 in turn drives a second intermediate gear 64. Intermediate gears 63 and 64 are meshed with arbor gears 34 and 35, respectively (see also FIG. 3) when the drive housing 53 is in its working position. It will be understood by one skilled in the art that if arbor pair 17 were in the working position, intermediate gears 63 and 64 would mesh with arbor gears 36 and 37 respectively. In this way, the hydraulic motor 61 will drive the arbors of either pair when in the working position.

As can be seen in any of FIGS. 3 through 6, the base 27 also supports on its upper surface a large diameter drum 65 having upper and lower parallel grooves 66 and 67 formed in its peripheral edge. At the inboard end of slitter frame portion 24 and the adjacent part of slitter frame portion 25 there is located a pair of pulleys 68 and 69. The pulley 68 is mounted on an inverted U-shaped frame member 70 which also serves as a mount for the bearing support 49 of jack shaft 48. The U-shaped support 70 is affixed directly to the slitter frame portion 24 as shown in FIG. 5. The pulley 69 is mounted on a bracket 71 fragmentarily shown in FIGS. 3 and 4. The bracket 71 is affixed to the upper surface of slitter frame portion 25. At the outermost end of slitter frame portion 25 a pair of sprockets 72 and 73 are supported on appropriate brackets 74 and 75 affixed to the slitter frame portion 25. The sprockets 72 and 73 are driven independently by their own individual hydraulic motors diagrammatically respresented at 76 and 77 in FIG. 3. It will be understood that other prime movers than hydraulic motors could be used if desired.

The drum 65, pulleys 68 and 69 and drive sprockets 72 and 73 are adapted to coact with a continuous chain-cable assembly generally indicated at 78. The chain-cable assembly is made up of two roller-chain segments 79 and 80 adapted to cooperate with drive sprockets 72 and 73, respectively. One end of each of roller chain segments 79 and 80 are joined together by a cable segment 81 passing about drum 65 in upper groove 66 thereof. The other ends of roller chain segments 79 and 80 are joined together by a second cable segment 82 passing about pulleys 68 and 69 and drum 65 in the lower groove 67 thereof. It will be noted that cable segments 81 and 82 pass about the drum 65 in opposite fashions.

The operation of the slitter of the present invention will now be described with respect to FIGS. 6, 7 and 9. FIG. 9 is a semi-diagrammatic representation of the structure of FIG. 6 illustrating the envelope described by the outboard ends of arbor pairs 15 and 17 during the shifting of arbor pair 15 from its working position to its set-up position and the simultaneous shifting of arbor pair 17 from its set-up position to its working position. When this change over is to be accomplished, the first step is to shift outboard bearing housing 40 to its retracted position as shown in FIG. 3. This not only frees the outboard ends of arbors 15a and 15b of arbor pair 15, but also disconnects jack shaft 48 from jack shaft 52 at the couplings 50 and 51. The air casters 28 through 31 constitute inflatable annular resilient members having central metal plates upon which the base 27 rests when the casters are deflated. Once the outboard bearing housing 40 has been shifted to its retracted position, the air casters 28 through 31 are activated by means of compressed air. This raises the base 27 and lifts the metallic centers of the casters out of contact with the smooth, sheet metal surface 26 of the slitter frame. The base 27 and the arbor pairs 15 and 17 carried thereby are now in condition to be shifted and rotated along surface 26 by the chain-cable assembly 78.

The first step in the shifting procedure is to simultaneously rotate drive sprocket 72 in a clockwise direction (as viewed in these Figures) and drive sprocket 73 in a counterclockwise direction (as viewed in these Figures) at the same speed. This results in a simple linear translation of the base 27 from its working position shown at 27a in FIG. 9 to an intermediate position indicated at 27b. Up to this point, no rotation of base 27 or arbor pairs 15 and 17 occurs. Once the intermediate position 27b has been reached by the base 27, drive sprocket 72 continues its clockwise rotation at the same speed while drive sprocket 73 continues its counterclockwise rotation at a lesser speed. This results in simultaneous translation and rotation of base 27 until it reaches the furthest extent of its translation along surface 26 indicated by index numeral 27c in both FIGS. 6 and 9. At this point, it will be noted that the base 27 and the arbor pairs 15 and 17 have been rotated 90° so as to be parallel with the center line 6 of the slitting line. Thereafter, drive sprocket 73 is caused to rotate in a clockwise direction at regular speed and drive sprocket 72 is caused to rotate in a counterclockwise direction at reduced speed. This results again in simultaneous rotation and translation of the base 27 and arbor pairs 15 and 17. Rotation of base 27 and arbor pairs 15 and 17 continues in a counterclockwise direction, but the translation of the these elements has reversed in direction. This mode continues until base 27 has again reached its intermediate position 27b. At this point, however, the base has completed 180° of rotation and the arbor pairs 15 and 17 have interchanged positions, as indicated at 15' and 17'. Once the base 27 has regained its intermediate position 27b with the arbor pairs reversed, drive sprocket 72 is rotated in a counterclockwise direction and drive sprocket 73 is rotated in a clockwise direction at the same speed, resulting in simple translation of the base to its working position 27a. At this point, the shifting of the arbor pairs 15 and 17 is complete. The air casters are deactivated, after which outboard bearing housing 40 may be moved by cylinder 41 to its working position in engagement with the outboard ends of arbors 17a and 17b of arbor pair 17, simultaneously reconnecting jack shafts 48 and 52 at couplings 50 and 51.

In FIG. 9, the open arrows illustrate that part of the envelope described by the outboard ends of arbor pair 15 during the interchange of position thereof with arbor pair 17. In similar fashion, the solid arrows illustrate that part of the envelope described by the outboard ends of the arbors of arbor pair 17. A comparison of FIGS. 9 and 1 will clearly show that the changeover envelope does not interfere with the slitting line element 8 immediately ahead of the slitter or the recoiler 20 and its mandrel 21. No interference occurs with threading table 19 since this table is in its elevated working position only during the thread-up procedure. It will be understood that if this changeover procedure is repeated, arbor pair 17 will return to its set-up position and arbor pair 15 will return to its working position in the same manner described above, with the same changeover envelope.

The roller chain segments 79 and 80 and the cable segments 81 and 82 are arranged in such a way that roller chain 79 is always in contact with drive sprocket 72 and roller chain 80 is always in contact with drive sprocket 73. By the same token, cable segment 81 is always in contact with drum 64 while cable segment 82 is always in contact with the drum 65 and the pulleys 68 and 69. The outer flights of the chain-cable assembly 78 tend to serve as guides for the base 27 and drum 65, assuring that the base will undergo minimal lateral shifting during its translation along the frame surface 26. A pair of guides 83 and 84 (see FIG. 6) are mounted on the surface 26 to assure proper positioning of the base 27 as it shifts to its working position 27a.

To achieve precise location of base 27 when in its working position 27a, the slitter frame and its smooth upper surface 26 are provided with a series of upstanding pins and the base 27 has a series of cooperating sockets. When the air casters are deflated and the base 27 lowers toward the frame surface 26, the pins enter the sockets thereby precisely locating the base 27 in its working position. It will be understood that this pin and socket arrangement will be such that each socket will cooperate with one of two pins depending upon whether arbor pair 15 or arbor pair 17 is in the working position.

One of the pin and socket assemblies is illustrated in FIG. 8. In this Figure, the base 27 is shown as having a bore 85 formed therein, provided with a bushing 86. In similar fashion, the slitter frame portion 25 has a bore 87 extending therethrough. The smooth sheet metal surface 26 has a coaxial perforation 88 therein. The perforation 88 and bore 87 receive the shank of an upstanding pin 89. When base 27 is in its working position and the air casters 28 through 31 have been deflated, the pin 89 will enter bushing 86 as shown. When change-over is to be accomplished and the air casters 28 through 31 are inflated, base 27 will elevate removing pin 89 from bushing 86.

While the primary purpose of the pin and socket arrangement just described is to precisely locate the base 27 in its working position, it will be understood that they will also tend to maintain the base in its working position. It is preferred, however, to additionally lock or clamp the base in its working position by means of three clamp elements engaging three sides of the base. Such clamps are shown at 90, 91 and 92 in FIG. 5. The clamps 90 through 92 are mounted on the surface 26 of the slitter frame. Each clamp engages a cooperating notch in the adjacent base edge. One such notch is shown in FIG. 5 at 93. The clamps 90 through 92 may shift either vertically or horizontally into and out of engagement with the base 27. The clamps may be actuated manually, electrically, hydraulic or by any other appropriate means.

Reference is now made to FIG. 10 which is a semi-diagrammatic illustration, similar to FIG. 9, of another embodiment of the slitter of the present invention. Like parts have been given like index numerals. The embodiment of FIG. 10 differs from that of FIG. 9 only in that the extended portion 25 of the slitter frame and the smooth surface 26 carried thereby are oriented at 90° to the slitter frame portion 24. To this end, the slitter frame extended portion is designated at 25a in FIG. 10, while the smooth surface carried thereby is designated at 26a.

With all other elements being substantially the same and with the translation and rotation of base 27 being conducted in precisely the same manner as described with respect to FIG. 9, the outboard ends of arbor pairs 15 and 17 define a heart-shaped envelope with its long axis parallel to the center line of the slitting line.

A comparison of FIGS. 1 and 10 clearly shows that the heart-shaped envelope defined by the outboard ends of arbor pairs 15 and 17 does not interfere with the element 8 ahead of the slitter 14 in the slitting line 1. The envelope does interfere, however, with recoiler 20. This problem can be eliminated by either locating the recoiler 20 at a slightly greater distance from the slitter or by providing means to shift the recoiler out of the way during arbor change-over.

FIG. 11 is another semi-diagrammatic view similar to FIGS. 9 and 10. In this instance an embodiment of the slitter is illustrated wherein the extended portion 25 of the slitter base and the upper surface 26 carried thereby are coextensive with a slitter base portion 24, lying at an angle of 90° to the center line of the slitting line. In FIG. 11, the extended portion of the slitter base is designated 25b and its smooth upper surface is designated 26b. With these exceptions, like parts have been given like index numerals.

In the embodiment of FIG. 11, if the base 27 and its arbor pairs 15 and 17 are shifted and rotated in precisely the same manner described with respect to FIG. 9 (with the exception that the intermediate position 27b of base 27 is at a greater distance from working position 27a than in the embodiments illustrated in FIGS. 9 and 10). The envelope described by the outboard ends of arbor pairs 15 and 17 is once again heart-shaped. The long axis of the heart-shaped envelope, in this instance, is perpendicular to the center line 6 of the slitting line. It will be evident from a comparison of FIGS. 1 and 11 that the envelope defined by the outboard ends of arbor pairs 15 and 17 will not interfere with any of the other elements in the slitting line either upstream or downstream of the slitter.

It will be understood from FIGS. 9, 10 and 11 that different envelopes can be achieved to accommodate different special requirements of the slitting line simply by properly selecting the necessary angular relationship between slitter base portions 24 and 25. This angular relationship can range from 90° as shown in FIG. 10 through 45° as shown in FIG. 9 to 180° as illustrated in FIG. 11.

The envelope defined by arbor pairs 15 and 17 can also be changed or adjusted by the manner in which drive sprockets 72 and 73 are operated. This is illustrated in FIG. 12 wherein the slitter embodiment is identical to that of FIG. 9 and like parts have been given like index numerals. To explain how the envelope illustrated in FIG. 12 is achieved, reference is again made to that Figure and FIGS. 6 and 7. Once the casters 28 through 31 of base 27 have been activated, drive sprocket 72 is run in a clockwise direction and drive sprocket 73 is run in a counterclockwise direction, both at the same speed so as to shift the base 27 from its working position 27a to its intermediate position 27b without rotation. It will be noted that the intermediate position 27b of FIG. 12 is at a greater distance from working position 27a than in FIG. 9.

Once the intermediate position 27b of base 27 has been reached, drive sprocket 72 continues to run in a clockwise direction while powered sprocket 73 is stopped. This results in the base 27 achieving its outermost position 27c, having rotated 90°. Unlike the instance illustrated in FIG. 9, it will be noted that the distance between the intermediate position 27b of base 27 and its outermost position 27c is very much shorter and in fact they overlap.

Once the base has reached its outermost position 27c, drive sprocket 73 is run in a clockwise direction and drive sprocket 72 is stopped. This causes the base 27 to return to its intermediate position 27b, having been rotated a full 180°. At this point, drive sprocket 72 is run in a counterclockwise direction and drive sprocket 73 is run in a clockwise direction, both at the same speed, to return base 27 to its working position 27a.

A comparison of FIGS. 9 and 12 shows that the envelope defined by the motion of the outboard ends of arbor pairs 15 and 17 can be markedly changed simply by the manner in which drive sprockets 72 and 73 are run.

From the above it will be evident to one skilled in the art that the slitter of the present invention may be designed to provide the quick change-over of arbor pairs without having to move any of the other slitting line equipment located either upstream or downstream of the slitter. The envelope defined by the arbor pair outboard ends during changeover can be designed to avoid other obstacles as well, such as pillars, supports and the like, by properly selecting the angular relationship of slitter base portions 24 and 25 or by properly programming the running of drive sprockets 72 and 73, or both. While the operation of drive sprockets 72 and 73 can be manual, it lends itself well to computer control, as is well known in the art.

Modifications may be made in the invention without departing from the spirit of it. For example, it is within the scope of the present invention to provide the base 27 with more than two pairs of arbors. This would require appropriate programming of the operation of drive sprockets 72 and 73. It would also be possible to shift and rotate the base and the arbor pairs it supports by hand or by means other than the chain-cable assembly described.

What we claim is:

1. A slitter for use in a slitting line, said slitter comprising a supporting frame having a first frame portion extending transversely of the center line of said slitting line with an inboard end to one side of said slitting line and an outboard end to the other side of said slitting line and a second frame portion extending from said inboard end of said first frame portion, said inboard end of said first frame portion and said second frame portion supporting a smooth upper surface, at least two pairs of cooperating blade carrying arbors, said arbors of said pairs each having an inboard end and an outboard end, an inboard bearing housing for each of said arbor pairs, said inboard ends of the arbors of each pair being mounted in their respective one of said inboard bearing housings, said inboard bearing housings being mounted on a common base, caster means on said base, said base and its caster means being located on said smooth upper surface of said support frame and being shiftable and positionable thereon with each arbor pair being shiftable thereby between a working position extending transversely of said center line of said slitting line and a set-up position extending away from slitting line, an outboard bearing housing slidably mounted at said outboard end of said first frame portion and being shiftable thereon between a retracted position and a position in which it engages said outboard ends of said arbors of any one of said arbor pairs when in said working position.

2. The structure claimed in claim 1 wherein said caster means comprise air casters.

3. The structure claimed in claim 1 wherein said slitter has two pairs of cooperating arbors, the axes of the arbors of both arbor pairs lying in the same vertical plane.

4. The structure claimed in claim 1 wherein the long axis of said first base portion forms an angle with the long axis of said second base portion within the range of from 90° to 180°.

5. The structure claimed in claim 1 including powered means to shift and rotate said base on said smooth frame surface to shift said arbor pairs between said working and set-up positions.

6. The structure claimed in claim 1 including a drum mounted on said base, a pair of spaced pulleys mounted on said support frame at said end of said smooth surface overlying said inboard end of said first frame portion and the adjacent portion of said second frame portion, a pair of spaced sprockets mounted at the free end of said second frame portion, a continuous chain-cable assembly comprising first and second roller chain segments and first and second cable segments, one end of each of said roller chain segments being joined together by said first cable segment, the other ends of said roller chain segments being joined by said second cable segment each of said first and second roller chain segments being engaged with one of said sprockets at all times, said first cable segment passing about said drum on said base, said second cable segment passing about each of said pulleys and about said drum in a direction opposite that of said first cable segment, and means to drive said sprockets independently with respect to speed and direction of rotation whereby to shift and rotate said base on said smooth surface to shift said arbor pairs between said working and said set-up positions.

7. The structure claimed in claim 1 wherein said base has a working position on said surface wherein any desired one of said arbor pairs is in its working position depending on the orientation of said base, one of said base and said smooth surface having socket means located therein, the other of said base and said smooth surface having pin means mounted thereon engagable in selected ones of said sockets to properly locate said base in said working position thereof.

8. The structure claimed in claim 1 wherein said base has a working position on said smooth surface wherein any desired one of said arbor pairs is in its working position depending on the orientation of said base, clamp means mounted on said smooth surface and being releasably engagable with said base to maintain said base in its working position.

9. The structure claimed in claim 4 including a drum mounted on said base, a pair of spaced pulleys mounted on said support frame at said end of said smooth surface overlying said inboard end of said first frame portion and the adjacent portion of said second frame portion, a pair of spaced sprockets mounted at the free end of said second frame portion, a continuous chain-cable assembly comprising first and second roller chain segments and first and second cable segments, one end of each of said roller chain segments being joined together by said first cable segment, the other ends of said roller chain segments being joined by said second cable segment, each of said first and second roller chain segments being engaged with one of said sprockets at all times, said first cable segment passing about said drum on said base, said second cable segment passing about each of said pulleys and about said drum in a direction opposite that of said first cable segment, and means to drive said sprockets independently with respect to speed and direction of rotaton whereby to shift and orient said base on said smooth surface to shift said arbor pairs between said working and said set-up positions.

10. The structure claimed in claim 9 wherein said base has a working position on said smooth surface wherein any desired one of said arbor pairs is in its working position depending on the rotational orientation of said base, one of said base and said smooth surface having socket means located therein, the other of said base and said smooth surface having pin means mounted thereon engagable in selected ones of said sockets to properly locate said base in said working position thereof.

11. The structure claimed in claim 10 including clamp means mounted on said smooth surface and being releasably engagable with said base to maintain said base in its working position.

12. The structure claimed in claim 11 wherein said caster means comprise air casters.

13. The structure claimed in claim 12 wherein said slitter has two pairs of cooperating arbors, the axes of the arbors of both arbor pairs lying in the same vertical plane.

* * * * *